June 7, 1955
H. L. McCLEERY
2,710,372
VARIABLE FREQUENCY AND VOLTAGE
APPARATUS FOR MOTOR CONTROL
Filed June 19, 1947
2 Sheets-Sheet 1
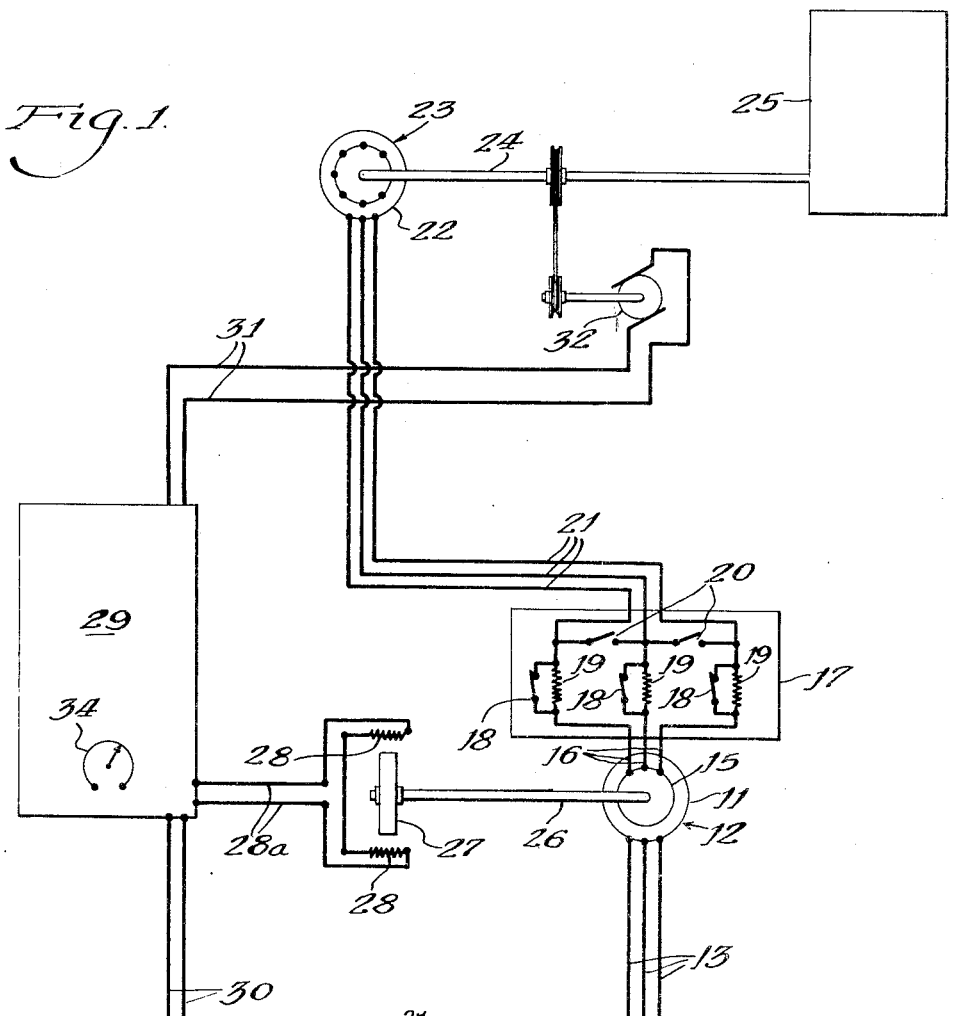
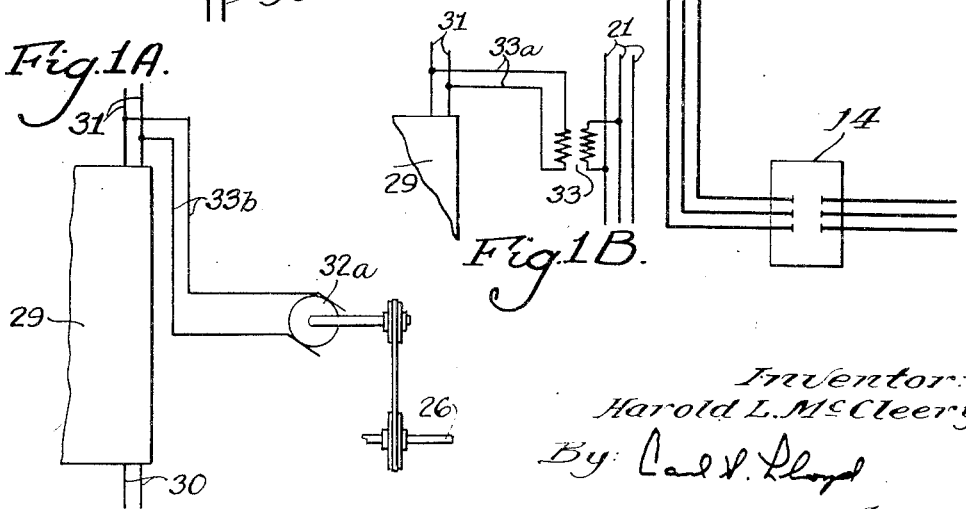
Inventor:
Harold L. McCleery
By Carl V. Lloyd
Attorney

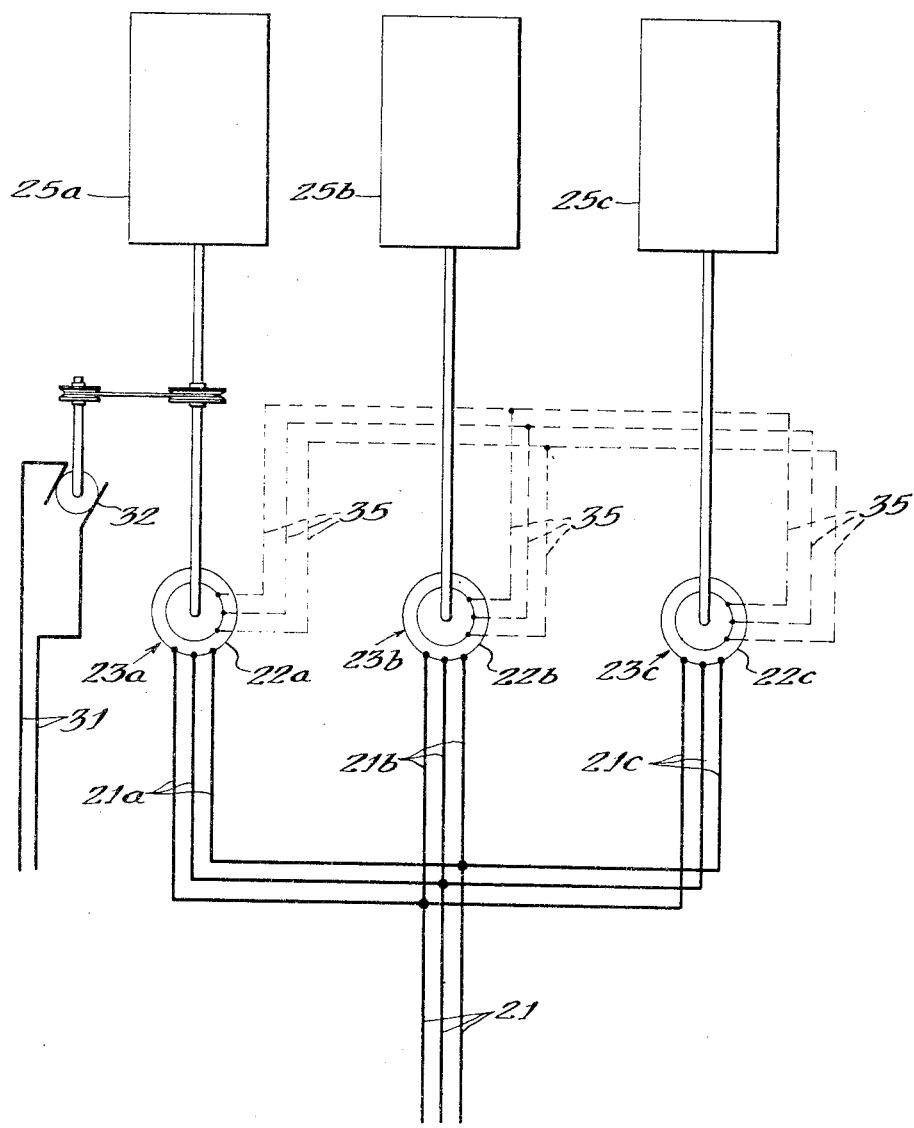

United States Patent Office 2,710,372
Patented June 7, 1955

2,710,372

VARIABLE FREQUENCY AND VOLTAGE APPARATUS FOR MOTOR CONTROL

Harold L. McCleery, Downers Grove, Ill.

Application June 19, 1947, Serial No. 755,575

22 Claims. (Cl. 318—231)

This invention relates to improvements in apparatus for providing variable frequency and voltage and more particularly to apparatus for regulating the speed of electric alternating current machines, such as induction motors and vibrators, by impressing thereon variable frequency and voltage.

Heretofore the most common method of regulating the speed of alternating current machines has been to employ adjustable resistances in the secondary circuits thereof. This method has been found satisfactory for certain applications in which a minimum of speed reduction is required, but high rheostat heat losses with a resulting low efficiency at reduced speeds, high initial cost, and poor speed regulation have created a demand for better and more efficient means of control.

Many methods have been suggested, and particularly so with regard to the regulation of the speed of induction motors, but all have had severe limitations. Multispeed squirrel-cage motors having separate electrically connectable stator windings of different sizes have been applied to certain uses, but these allow only the choice of a few invariable speeds. A similar method, called concatenation, comprising the use of two or more wound rotor motors electrically connected in series and rotating on the same shaft has found some favor, but again the speeds obtainable, being in a ratio with the sum or the difference in the number of poles, are limited to a definite few. Still another method, one which has found many modern variations, makes use of a saturable-core reactor or resistor disposed in series with the motor's primary winding. By varying the amount of direct current applied to saturate the reactor, variable voltage is impressed upon the motor's primary windings and a considerable speed variation results when a high resistance rotor is employed. Besides requiring a source of direct current, this latter method causes greatly increased motor current at reduced speeds which produces motor heating, and the overall efficiency obtained is approximately equal only to that of the secondary resistance method mentioned above.

For many years it has been known that the most ideal scheme for regulating the speed of alternating current machines is to impress upon the primary windings thereof a variable frequency and voltage. Heretofore this has usually been accomplished by the expensive use of an independent variable frequency power supply which, when full power is needed in starting, has required the employment of an oversize generator.

To overcome many of the disadvantages inherent in prior schemes for regulating the speed of alternating current machines, I have devised the present apparatus, an object of my invention being to provide an efficient means for regulating and smoothly varying the speed of such machines through a speed range of near zero to a maximum.

Another object of my invention is to provide, in an apparatus of this character, the means for maintaining substantially constant any selected speed under varying load conditions.

A further object of my invention is to eliminate from such speed regulation means the use of resistors and thus avoid excessive heat losses caused by the use of the same.

Still another object of my invention is to provide a means by which a plurality of such machines may be operated in substantial synchronization, without mechanical connection, and under varying load conditions, at any selected speed through a speed range of near zero to a maximum.

A further object of my invention is to provide an apparatus for accomplishing the above objectives which is simple to install, operate and maintain, and which has a comparatively low initial cost.

Other objects and advantages of the invention will be apparent from the following description of a preferred embodiment thereof in a three phase electrical system, taken in connection with the accompanying drawings, in which:

Figure 1 is a schematic illustration of the invention showing the same adapted for controlling the speed of a single induction motor;

Figure 1A is a fragmentary view showing a modification of one of the elements of the apparatus;

Figure 1B is a similar view showing another modification of this element; and

Figure 2 is a similar drawing illustrating an adaptation of the invention to provide a means for simultaneously controlling the speeds of a plurality of induction motors so as to obtain synchronous or near synchronous speed relationships between all motors.

Referring in detail to the said drawings, the stator windings 11 of a wound-rotor, three-phase induction motor shown generally at 12, used and hereinafter referred to as a rotary frequency changer, are electrically connected by conductors 13 to a source of constant power (not shown) through an ordinary line-starter 14. Secondary or rotor windings 15 of said rotary frequency changer are connected electrically to conductors 16 which lead to an automatic switch and resistance panel 17 of a type well known to the art and which may comprise three sets of automatic cut-out switches 18 and resistances 19, one of the former being in parallel with one of the latter in each of the conductors 16, and two cut-out switches 20 disposed electrically between said conductors 16 to provide means for short circuiting the latter.

By the well known use of springs and solenoids (neither of which is shown) the switches 18 are arranged to break contact and the switches 20 to close contact when power to the frequency changer 12 is interrupted. In this manner the tendency for high current to be induced in the rotor windings 15 when electric power is again applied to said frequency changer is reduced by causing said current to flow through the resistances 19 in the circuit provided by the short circuiting action of the switches 20.

After the frequency changer 12 has been started by the use of the line-starter 14, switches 20 may be manually or otherwise opened and the switches 18 similarly closed to allow any current induced in the rotor windings 15 to flow freely through the conductors 16 and conductors 21 (the latter being extensions of the former beyond the panel 17) into stator windings 22 of an induction drive motor shown at 23, the speed of which is to be ultimately controlled. The motor 23, which may be of either the squirrel-cage, synchronous, or wound-rotor type, shown in Figure 1 to be the former, may be arranged, by means of a drive shaft 24 or otherwise, to drive a machine 25.

Upon an extension 26 of the rotor shaft of the frequency changer 12 is mounted a steel drum 27 about which is disposed a stationary field winding 28. Said drum and field winding comprise an eddy-current brake of a type well known to the art. The speed of the rotor of the frequency changer 12 is controlled by the braking action of the eddy-current brake when the field winding 28 is electrically excited through conduits 28a by an electronic governor 29 which may be constructed in accordance with the teachings of Winther as disclosed in United States Patent No. 2,277,284 issued on March 24, 1942.

Said governor receives a constant electrical excitation from a single phase constant power source (not shown) through conductors 30, and may be supplied with a varying electrical excitation, through conductors 31, by a small alternating current generator 32 which may be driven by any appropriate connection with the shaft 24, said connection being shown in the drawings to be of the common belt and pulley type. Said varying electrical excitation may also be provided, if so desired, by the use of an alternating current generator 32a similarly connected to the shaft 26 or by the use of a transformer 33 electrically disposed between two of the conductors 21. Said generator 32a and transformer 33 are shown in Figures 1A and 1B and it will be understood that either of them may be so used in any application of my invention. The electrical excitation produced by each may respectively be transmitted to the governor 29 by means of conductors 33a and 33b as shown.

A potentiometer 34 is incorporated in the electronic circuit of the governor 29 as taught by Winther. By its adjustment the operator may select a reference voltage for a grid circuit in said electronic governor 29 corresponding to the frequency desired to be supplied to the motor 23. Said reference voltage will react on said governor and cause current to flow from the latter through the conductors 28a to the windings 28 to brake the speed of the frequency changer 12 and cause the rotor thereof to lag. A resulting current is induced in the windings 15 by the lagging of said rotor and is transmitted, in the manner above described, to the motor 23 to cause the rotor thereof to turn.

By changing the position of the potentiometer 34, the amount of current flowing through the windings 28 may be manually regulated over a range from near zero to an amount sufficient to cause a braking action strong enough to substantially stop the rotor of the frequency changer 12. Obviously, the slower the rotor of said frequency changer is allowed to turn, the nearer the frequency of the current induced in the windings 15 and transmitted to the motor 23 will approach the frequency of the power source. Thus the braking action on said frequency changer causes the same to act as a rotary converter, supplying current to the motor 23 in voltage and frequency directly proportional to the reduction in the speed and consequently the frequency of the frequency changer below its synchronous speed, with the greatest frequency which may be supplied to said motor 23 being nearly that of the power source and the maximum voltage being dependent upon the number of windings in the windings 15. Since the speed at which the motor 23 will turn varies in direct proportion to the voltage and frequency of the current which reaches it, its speed may be smoothly varied by the use of the potentiometer 34 in the electronic governor 29.

Any speed selected for said motor 23 may be maintained substantially constant through varying load conditions by the functioning of the generator 32, 32a, or the transformer 33 in connection with the electronic exciter 29. Any variation in the speed of the motor 23 will cause the voltage produced by the generator 32 connected to the shaft 24 or the voltage produced by the transformer 33 to increase or decrease. This change of voltage, being transmitted to the electronic exciter 29, will cause the current flowing in the windings 28 to vary in an inverse proportion. Thus, if a change in the load on the motor 23 causes the same to tend to be reduced in speed, the current flow in the windings 28 is increased, which in turn increases the braking action on the frequency changer 12 causing it to turn slower with a resulting increase in the voltage and frequency supplied to said motor 23, which will cause the latter to maintain the selected speed. An increase in the speed of the motor 23 through a reduction of the load thereon will obviously result in a reaction opposite to that just described and the speed of said motor 23 will be caused to come down to the selected speed.

When the generator 32a is used in connection with the shaft 26, any change in the load on the motor 23 tending to reduce its speed will cause an increase in the flow of current from the power source into the frequency changer 12, increasing the torque produced thereby and causing said shaft to increase its speed of rotation. This increase in speed will cause an increase in the voltage produced by the generator 32a which, upon being transmitted to the governor, will cause the latter to increase the flow of current in the windings 28 and increase the braking action of the eddy-current brake to bring the speed of the shaft down to its former speed whereby the voltage and frequency supplied to the motor 23, and, consequently, its speed, will be maintained constant in spite of the increased load thereon. A reduction in the load on the motor 23, causing an increase in its speed, will, of course, result in a reaction opposite to that just described and the speed of said motor will be brought down to the speed previously selected.

It will thus be apparent from the above description that any speed for the motor 23 may be selected through a range from near zero to a maximum and be maintained nearly constant through varying load conditions. It will also be understood that, when the generator 32a is employed with the apparatus, a change in the load on the motor 23 tending to change its speed will result in a change in the excitation transmitted to the governor 29 opposite in value to that supplied when the generator 32 or the transformer 33 are used. A governor for use with the generator 32a is, therefore, required to have a polarity arrangement within its electronic circuit opposite to that within a governor for use with the generator 32 or the transformer 33. The simple changes within the electronic circuit necessary to produce said opposite polarities will readily be understood by those having knowledge of the art.

In Figure 2 I illustrate a manner in which the above described invention may be adapted to regulate the speed of a plurality of induction motors driving separate machines or separate parts of the same machine. The conductors 21 may be branched to form conductors 21a, 21b, and 21c which are electrically connected respectively to the stator windings 22a, 22b, and 22c of three induction motors 23a, 23b, and 23c which are shown respectively to be driving the separate machines 25a, 25b and 25c. The generator 32 is connected to the drive shaft 24a of one of the machines 25, in the same manner as above described, with the conductors 31 leading to the electronic exciter 29 (not shown in Figure 2). In this manner the speed of all three motors may be regulated by the use of the potentiometer 34 and exciter 29 as hereinbefore described.

Where the three motors are used to operate the separate machines 25a, 25b and 25c, or separate parts of a single machine, with synchronous or near synchronous speed relationships between the motors, the rotors of the motors 23a, 23b and 23c may be of the wound-rotor type, as illustrated in Figure 2, and the same may be electrically connected by the conduits 35 (shown in broken lines) in the well known Selsyn manner. A similar result may be obtained by the substitution of motors of the synchronous type for the motors 23a, 23b and 23c.

While I have illustrated and described only an application of my invention whereby the speeds of electric motors may be regulated, it will be understood that the apparatus is useful for supplying current at any selected constant voltage and frequency for any purpose.

The foregoing detailed description has been given for clearance of understanding only, and no unnecessary limitations should be understood therefrom, but the appending claims should be construed as broadly as permissible in view of the prior art.

I claim:

1. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; means for controlling said brake to cause the same to regulate the speed of said frequency changer throughout a speed range including all intermediate speeds from near line frequency down to near zero frequency and, conducting means for transmitting said variable and controllable voltage and frequency to said machine whereby the same will be driven at a speed relative to the value of said voltage and frequency so transmitted.

2. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; an eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; and, controllable means for electrically exciting said eddy-current brake and causing the same to regulate the speed of said frequency changer throughout a speed range including all intermediate speeds from near line frequency down to near zero frequency.

3. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; means for causing said brake to apply a selective mean braking force upon said shaft; and, a device in association with said means responsive to the speed of said machine whereby said means will be caused to maintain or automatically vary said mean braking force to control the value of said voltage and frequency and thereby maintain substantially constant said speed of said machine despite varying load conditions thereon.

4. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; means for supplying electrical excitation of selective mean intensity to said eddy-current brake; and, a device in association with said means responsive to the speed of said machine whereby said means will be caused to maintain or automatically vary said mean intensity to control the value of said voltage and frequency and thereby maintain substantially constant said speed of said machine despite varying load conditions thereon.

5. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; means for causing said brake to apply a selective mean braking force upon said shaft; and, a device in association with said means responsive to the speed of rotation of said shaft whereby said means will be caused to maintain or automatically vary said mean braking force to control the value of said induced voltage and frequency and thereby maintain substantially constant said speed of said machine despite varying load conditions thereon.

6. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; means for supplying electrical excitation of selective mean intensity to said eddy-current brake; and, a device in association with said means responsive to the speed of rotation of said shaft whereby said means will be caused to maintain or automatically vary said mean intensity to control the value of said induced voltage and frequency and thereby maintain substantially constant said speed of said machine despite varying load conditions thereon.

7. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; means for causing said brake to apply a selective mean braking force upon said shaft; and, a device in association with said means responsive to any change in the value of said voltage and frequency whereby said means will be caused to maintain or automatically vary said mean braking force to control said value of said voltage and frequency and thereby maintain substantially constant said speed of said machine despite varying load conditions thereon.

8. Apparatus for selectively regulating the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; means for supplying electrical excitation of selective mean intensity to said eddy-current brake; and, a device in association with said means responsive to any change in the value of said voltage and frequency whereby said means will be caused to maintain or automatically vary said mean intensity to control said value of said voltage and frequency and thereby maintain substantially constant said speed of said machine despite varying load conditions thereon.

9. Apparatus for selectively controlling the speed of an electric alternating current machine, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machine whereby the same will be driven at a speed relative to the value of said voltage and frequency so transmitted; an electronic device for supplying electrical excitation of selective mean intensity to said eddy-current brake; and, means in association with said device responsive to the speed of said machine whereby said device will be caused to maintain constant or automatically vary said mean intensity to control the value of said voltage and frequency and thereby maintain substantially constant said speed of said machine despite varying load conditions thereon.

10. Apparatus for providing a variable frequency and voltage, comprising: a wound-rotor induction motor, operatable as a voltage and frequency changer, having stationary primary windings electrically connectable to an invariable source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause a current of variable and controllable voltage and frequency to be induced in said secondary windings; means for conducting said variable and controllable voltage and frequency from said secondary windings; an electronic device for supplying electrical excitation of selective mean intensity to said eddy-current brake; and means in association with said device responsive to the speed of said shaft whereby said device will be caused to maintain constant or automatically vary said mean intensity and thereby maintain constant said voltage and frequency.

11. Apparatus for providing a variable frequency and voltage, comprising: a wound-rotor induction motor, operatable as a voltage and frequency changer, having stationary primary windings electrically connectable to an invariable source of alternating current electric power and having secondary windings fixedly mounted upon a rotatable shaft which will be induced to rotate when said electric power is supplied to said primary windings; a controllable eddy-current brake in association with and responsive directly to changes in the speed of said shaft and the secondary frequency of said motor, said brake being thus adapted to reduce the speed of rotation of said shaft to cause said secondary windings to lag by controllable degrees and to thus cause a current of variable and controllable voltage and frequency to be induced in said secondary windings; means for conducting said variable and controllable voltage and frequency from said secondary windings; an electronic device for supplying electrical excitation of selective mean intensity to said eddy-current brake; and means in association with said device responsive to any change in value of said voltage and frequency whereby said device will be caused to maintain constant or automatically vary said mean intensity and thereby maintain constant said voltage and frequency.

12. A motor speed control comprising an induction motor adapted for coupling to a load, an induction frequency converter having its secondary connected to the field of said induction motor, an eddy-current slip coupling mounted on the shaft of said converter, said slip coupling having a field coil, a controller for adjustably exciting said field coil, and a shorting circuit for the converter secondary adapted to be closed and to short the secondary during starting and adapted to be opened after the converter has reached a speed near synchronous speed.

13. A motor speed control comprising an induction motor adapted for coupling to a load, an induction frequency converter having its secondary connected to the field of said induction motor, an eddy-current slip coupling connected to the shaft of said converter, said slip coupling having a field coil, a control circuit for adjustably exciting said field coil, a generator coupled to the shaft of said induction motor, said generator being connected to feed to said control circuit for varying the excitation of the field coil of the slip coupling inversely to the motor speed.

14. An adjustable-speed induction-motor drive comprising an induction motor adapted for coupling to a load, an induction frequency converter having its secondary connected to the field of said induction motor, an eddy-current brake mounted on the shaft of said induction motor, said brake having a field coil and a controller for adjustably exciting said field coil, said controller including a generator responsive to the speed of said induction motor for varying the excitation of said brake field coil inversely to the speed of the induction motor.

15. A motor speed control comprising a plurality of motors adapted for coupling to loads to be driven, respectively, thereby, an induction frequency converter having its secondary connected to the fields of said motors, an eddy-current slip coupling mounted on the shaft of said converter, said slip coupling having a field coil, a controller for adjustably exciting said field coil, and a short circuit for the converter secondary adapted to be closed and to short the secondary during starting, and adapted to be opened after the converter has reached a speed near synchronous speed.

16. Apparatus for selectively regulating the speed of a plurality of electric alternating current machines, comprising: a wound rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machines whereby the same will be driven at a speed relative to the value of said voltage and frequency so transmitted; means for causing said brake to apply a selective mean braking force upon said shaft; and a device in association with said means responsive to the speed of said machines whereby said means will be caused to maintain or automatically vary said mean braking force to control the value of said voltage and frequency and thereby maintain substantially constant said speed of said machines despite varying load conditions thereon.

17. Apparatus for selectively regulating the speed of a plurality of electric alternating current machines, comprising: a wound-rotor induction motor, operatable as a voltage and frequency changer, having stationary primary windings electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being there adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machines whereby the same will be driven at a speed relative to the value of said voltage and frequency so transmitted; means for causing said brake to apply a selective mean braking force upon said shaft; and a device in association with said means responsive to the speed of rotation of said shaft whereby said means will be caused to maintain or automatically vary said mean braking force to control the value of said induced voltage and frequency and thereby maintain substantially constant said speed of said machines despite varying load conditions thereon.

18. Apparatus for selectively regulating the speed of a plurality of electric alternating current machines comprising: a wound-rotor induction motor, operatable as a voltage and frequency changer, having stationary primary winding electrically connectable to a source of alternating current electric power and having secondary windings fixedly mounted upon a rotatable shaft which will be induced to rotate when said electric power is supplied to said primary windings; a controllable brake in association with and responsive directly to changes in the speed of said shaft and the secondary frequency of said motor, said brake being thus adapted to reduce the speed of rotation of said shaft to cause said secondary windings to lag by controllable degrees and to thus cause current of variable and controllable voltage and frequency to be induced in said secondary windings; conducting means for transmitting said variable and controllable voltage and frequency to said machines whereby the same will be driven at a speed relative to the value of said voltage and frequency so transmitted; means for causing said brake to apply a selective mean braking force upon said shaft; and a device in association with said means responsive to any change in the value of said voltage and frequency whereby said means will be caused to maintain or automatically vary said mean braking force to control said value of said voltage and frequency and thereby maintain substantially constant said speed of said machines despite varying load conditions thereon.

19. A motor speed control comprising an induction motor adapted for mechanical coupling to a load, an induction frequency converter having its secondary electrically connected to the said motor, a magnetic slip coupling having a field and mechanically connected for mechanically loading said converter, and an electrical control which is directly responsive to rotation of the induction motor and adapted to regulate the field of the slip coupling so that for incipient decrease in speed of the motor the slip in the coupling is decreased to increase said mechanical loading on the converter, and for incipient increase in speed of the motor the slip in the coupling is increased to decrease said mechanical loading on the converter.

20. An adjustable motor speed control comprising an induction motor adapted for coupling to a load, an induction frequency converter having its secondary connected to the field of said induction motor, an eddy-current slip coupling mounted on the shaft of said converter, said slip coupling having a field coil and a controller for adjustably exciting said field coil, said controller including a governor for varying the excitation of said field coil inversely in response to speed variations of said first induction motor.

21. A motor speed control comprising an induction motor adapted for coupling to a load, an induction frequency converter having its secondary connected to the field of said induction motor, an eddy-current slip coupling mounted on the shaft of said converter, said slip coupling having a field coil, a controller for adjustably exciting said field coil, and a generator on the induction motor shaft connected for feeding a speed responsive voltage to said controller.

22. A motor speed control comprising an induction motor adapted for coupling to a load, an induction frequency converter having its secondary connected to the field of said induction motor, an eddy-current slip coupling mounted on the shaft of said induction frequency converter, said slip coupling having a field coil and a control circuit for adjustably exciting said field coil, said control circuit including a generator responsive to the speed of said induction motor for varying the excitation of said field coil inversely to the speed of the induction motor.

References Cited in the file of this patent

UNITED STATES PATENTS

| | | |
|---|---|---|
| 1,728,633 | Schmidt | Sept. 17, 1928 |
| 1,749,304 | Scheppmann et al. | Mar. 4, 1930 |
| 2,074,126 | Mead | Mar. 16, 1937 |
| 2,286,777 | Winther et al. | June 16, 1942 |
| 2,335,874 | Moyer et al. | Dec. 7, 1943 |

FOREIGN PATENTS

| | | |
|---|---|---|
| 262,085 | Great Britain | Nov. 3, 1927 |
| 95,136 | Switzerland | June 16, 1922 |
| 688,191 | France | May 6, 1930 |
| 724,777 | France | Jan. 30, 1932 |
| 554,861 | Germany | July 13, 1932 |